United States Patent [19]

Goel et al.

[11] Patent Number: 4,762,864

[45] Date of Patent: * Aug. 9, 1988

[54] HIGH PERFORMANCE INDUCTION CURABLE TWO-COMPONENT STRUCTURAL ADHESIVE WITH NONSAGGING BEHAVIOR

[75] Inventors: Anil B. Goel, Worthington; Joseph G. Holehouse; Jeffrey P. Jones, both of Columbus; Teresa DeLong, Marysville, all of Ohio

[73] Assignee: Ashland Oil Inc., Ashland, Ky.

[*] Notice: The portion of the term of this patent subsequent to Mar. 25, 2003 has been disclaimed.

[21] Appl. No.: 876,060

[22] Filed: Jun. 19, 1986

[51] Int. Cl.$^4$ .......................... C08K 3/22; C08K 3/08; C08L 13/00; C08L 63/00

[52] U.S. Cl. .................................. 523/428; 523/429; 523/458; 523/468; 523/300; 252/513; 156/272.4

[58] Field of Search ............... 523/442, 458, 428, 300, 523/429; 252/513

[56] References Cited

U.S. PATENT DOCUMENTS

| | | | |
|---|---|---|---|
| 3,024,711 | 3/1962 | Madison | 523/442 |
| 3,306,809 | 2/1967 | Williamson | 528/111 |
| 3,371,044 | 2/1968 | Cochardt | 523/458 |
| 3,620,876 | 11/1971 | Guglielmo | 524/440 |
| 3,645,969 | 2/1972 | Harvey | 528/111 |
| 3,655,818 | 4/1972 | McKown | 523/428 |
| 4,129,548 | 12/1978 | McDonnell | 523/458 |
| 4,465,542 | 8/1984 | Furihata | 523/428 |
| 4,485,229 | 11/1984 | Waddill | 528/111 |
| 4,578,424 | 3/1986 | Goel | 528/118 |
| 4,581,158 | 4/1986 | Lin | 523/458 |

FOREIGN PATENT DOCUMENTS

| | | | |
|---|---|---|---|
| 0171604 | 2/1986 | European Pat. Off. | |
| 61-103977 | 5/1986 | Japan | 523/458 |
| 328153 | 2/1972 | U.S.S.R. | 523/458 |
| 1134592 | 1/1985 | U.S.S.R. | 523/458 |

*Primary Examiner*—C. Warren Ivy
*Attorney, Agent, or Firm*—John F. Jones

[57] ABSTRACT

An adhesive composition which is curable by electromagnetic induction heating when it is applied to various substrates, said adhesive comprising a mixture of
(I) An epoxy resin component and
(II) A hardener component and
(III) From 2 to 60% by weight of (I) and (II) of an electromagnetic energy absorbing material is described.

5 Claims, No Drawings

HIGH PERFORMANCE INDUCTION CURABLE TWO-COMPONENT STRUCTURAL ADHESIVE WITH NONSAGGING BEHAVIOR

This invention relates to a two component epoxy adhesive which is curable by induction heating and which requires very short cure times and has excellent performance as a structural adhesive comprising two stable components, namely, a first epoxy component containing a ferromagnetic filler and a rubber modified epoxy resin said first component having low dilatency, and a second hardener component containing a mixture of long chain poly(alkylene oxide) di- or tri-primary amine (molecular weight of 2000 or greater), a medium molecular weight poly(alkylene oxide) di- or tri-amine (molecular weight of from about 200 to about 600), a low molecular weight amine (molecular weight of less than about 250), mono- or polyphenol and an accelerator such as a tertiary amine and said second component being filled with a ferromagnetic filler such as metal particles and/or a metal oxide powder.

The method for heat sealing and bonding heat sealable thermoplastic surfaces by depositing fine susceptor particles of ferromagnetic oxides between specific predetermined sealing areas of two units of thermoplastic material by means of high frequency induction heating has been reported in U.S. Pat. No. 3,461,014. This idea has been carried forward to the use of both liquid and solid forms of mixtures of ferromagnetic particles and thermoplastics to form adhesives useful in sealing thermoplastic materials together by induction heating, U.S. Pat. Nos. 3,620,875 and 3,620,876. Induction heaters are similar, but not identical to dielectric heaters. For instance, the following differences between the two exist. In induction heating magnetic properties are substituted for dielectric properties, a coil is employed to couple the load rather than electrodes or plates, and induction heaters couple maximum current to the load. The generation of heat by induction operates through the rising and falling of a magnetic field around a conductor with each reverse of an alternating current source.

The use of induction heating for extremely rapid and complete cure of highly flexible epoxy adhesives containing ferromagnetic particles therein has not previously been reported. This discovery is of great value in the mass production of fiber reinforced sheet molding compound (SMC) automotive parts wherein formed parts are adhered together in numerous of the automotive components.

Most of the present day two-component epoxy adhesives are cured by commonly available low molecular weight amine curing agents and the cured products are known to be very stiff and brittle thus causing problems such as bond readout in fiberglass reinforced plastics bonding. Prior art use of flexibilizers such as polyurethane elastomers or rubbers in quantities sufficient to be beneficial often results in significant increase in viscosities of the components as well as severe loss of some physical properties in the cured adhesive. Use of certain combinations of long chain poly(alkylene oxide) polyamines as described in U.S. Pat. Nos. 3,306,809; 3,645,969; and 4,485,229 provide flexible epoxy polymer compositions, however, these compositions often lack several important properties which are extremely important for adhesive applications including nonsag behavior, rapid curing at moderately elevated temperatures with a long room temperature open time, etc. We have discovered induction curable flexible thermoset adhesive compositions having nonsag properties and long ambient temperature, open time and which undergo rapid curing.

Most of the known polymeric compositions based on the epoxy resin thermally curing with active hydrogen compounds such as polyamines, polycarboxylic acids, polyphenols, etc. exhibit reasonably good adhesion properties towards stiff structural substrates such as metals and high modulus reinfoced thermoset plastic materials, they usually require excessively long (greater than one minute) cure times and are usually too stiff and brittle to provide good thermoset adhesive bonding with substrates such as flexible sheet molding compounds (fiberglass reinforced polyester) and other plastics and they also usually result in excessive bond readout (deformation) in the adhered product. Prior art addition of flexibilizers such as butadiene rubbers, urethane elastomers, etc. generally results in significant increase in the viscosities of the two components of the epoxy adhesive when they are used in quantities sufficient to impart meaningful flexibility to the adhesive product. The use of plasticizers and monoepoxide diluents causes loss of adhesion in these prior art systems. Certain epoxy-based compositions described in U.S. Pat. Nos. 3,306,809; 3,645,969 and 4,485,229 using long chain poly(alkylene oxide) polyamines as curing agents have been claimed to be flexible providing good adhesion towards metal substrates; however, these thermally cured compositions lack one or more of the various desired features of high performance adhesives useful in applications such as bonding of fiberglass reinforced plastic parts of an automotive assembly. Some of the key desired features of two-component structural adhesives for many types of applications include:

Individual components having low dilatency and adequate processible viscosities.

Noncritical mix ratios (ratio tolerance).

Nonsagging character of the mixed adhesive immediately after mixing of the two components. Nonsagging property is the lack of flow of a bead of the adhesive when it is applied to a vertical surface.

Reasonably long ambient temperature (application temperature) open time (generally about 20 minutes or more).

Rapid green strength (handling strength of approximately 50 psi) build up in one minute or less of curing.

No need of rigorous substrate surface preparation (cleaning, scratching, scrubbing, priming, etc.).

High flexibility and tough adhesive bond with high shear and peel strengths at temperatures of from room temperature to about 200° F.

Low hygroscopicity of adhesive.

High heat resistance (approximately 400° F. for one hour or more).

An objective of the present invention is to provide an improved induction curable (electromagnetically induction bonding) structural adhesive having the above described desired features and particularly the rapid green strength buildup mentioned above. In accordance with the invention, various induction curable compositions of structural adhesives have been developed which have the combination of all the above physical curing rates and adhesion properties. These adhesive compositions are based on two components. One component (epoxy resin component) comprises an epoxy resin modified by from 1–15% by weight of carboxylic acid terminated butadiene/acrylonitrile rubber based on the weight of the epoxy resin for improved flexibility and toughness and blended with a flexible di- or tri-glycidyl ether of poly(alkylene glycol) (1 to 15% by weight of the total epoxy resin). It has been found that use of such diglycidyl ether of poly(alkylene glycol) results in improving the flexibility of the adhesive polymer. This epoxy resin component is filled with from 2 to 50% by weight of the other epoxy ingredients of an electromagnetic energy absorbing material which includes particulate magnetizable metals including iron, cobalt and nickel or magnetizable alloys of nickel and iron and nickel and chromium and inorganic oxides such as ferric oxide, nickel oxide and carbonaceous compositions and mixtures thereof, for electromagnetic energy absorbance. Other commonly used fillers such as talc, kaolin, aluminum oxide, etc. (up to 30% by weight of the epoxy resin) and thixotropic character can be built up by adding fumed silica (1 to 8% by weight based on the epoxy resin). It has been found that the use of di- or tri-glycidyl ethers of polyalkylene glycol also helps improve the thixotropic property of the component and reduces the dilatency of the resin. Optionally, additional chemical thixotropic materials such as isocyanates as described in U.S. Pat. No. 4,578,424 may also be added.

The second component which is designated the hardener component comprises (a) 50–90% by weight of a high molecular weight (greater than 2000) poly(alkylene oxide) di- or tri-primary amine, (b) up to 20% by weight of medium molecular weight (200 to 600) poly(alkylene oxide) di- or tri-primary amine and/or amidoamine. (c) up to 10% by weight of low molecular weight primary or secondary mono or polyamine which may also contain a tertiary amino group, for instance, ethylene diamine, aminoethylpiperazine or diethanol amine, (d) from 2 to 15% by weight of a phenolic compound such as Bisphenol-A, and (e) an amine-cure accelerator (up to 15% by weight) such as tertiary amine group containing molecules; e.g., tris(dimethylaminoethyl) phenol, boron trifluoride-amine complex and the like. The hardener component ingredients, of course, must always total 100% by weight. It is important to mention here that in order to obtain a good balance of long room temperature open time and rapid cure, the combined amounts of low molecular weight amine, the phenolics and the accelerator must be in the range of from 5 to 33 weight percent of the total hardener component. The total of the ingredients of this component is always 100%. The specific amounts of these accelerator compositions are largely dependent on the desired open time and cure time as well as the types of materials used. The use of phenolics, and particularly the di-phenolics such as Bisphenol-A, is strongly desired in order to improve the flexibility, cure rate and the adhesive performance. Use of certain phenolics also help cause phase separation, thus toughening the polymer.

The hardener component as defined above is filled with ferromagnetic fillers such as powdered metals and metal oxides (2 to 60% by weight of the hardener component) and may also include other fillers such as talc, kaolin, alimunum oxide, etc. in amounts up to 30% by weight. The total amount of ferromagnetic and nonferromagnetic fillers may not exceed 60% of the total weight of this component. The thixotropic properties of the hardener component may be improved by adding small amounts (0.5 to 5% by weight) of fumed silica.

The two components as described above provide a high performance adhesive when mixed and this adhesive has all of the desirable properties listed earlier when the components are mixed in stoichiometric weight ratios with a variation of as much as 50% or more and the resulting mixture is cured by electromagnetic induction.

The adhesive compositions of this invention provide excellent adhesion to various types of structural materials including fiber reinforced plastic materials sheet molding compound (SMC), metal, glass, wood and the like without the use of any primer or any type of surface preparation commonly used in the prior art.

The epoxy resins (polyepoxides) useful in this invention include monomeric and polymeric, saturated or unsaturated, aliphatic, cycloaliphatic, aromatic or heterocyclic polyepoxides which can be substituted if desired with other substitutents besides the epoxy groups, e.g., hydroxyl groups, ether radicals, halogen atoms and the like.

Typical epoxy components suitable in the practice of this invention include those disclosed in U.S. Pat. Nos. 2,500,600 and 2,324,483 which are incorporated herein by reference. Preferred in this invention are 1,2-epoxy compounds having an epoxide equivalence greater than 1, that is to say, compounds containing more than one group of the formula:

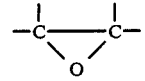

The 1,2-epoxide groups may be either terminal or inner ones. Particularly suitable terminal 1,2-epoxide groups are 2-epoxy ethyl or 1,1-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring.

As epoxy compounds containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, vinyl cyclohexene diepoxide, epoxidized diolefinically unsaturated carboxylic acid esters, such as methyl 9,10,12,13-diepoxy stearate or the dimethyl ester of 6.7,10,11-diepoxyhexadecane-1,1,6-dicarboxylic acid. Furthermore, there may be mentioned epoxidized mono-, di-, or polyesters and mono-, di-, or polyacetals containing at least one cycloaliphatic 5-membered or 6-membered ring, to which at least two 1,2-epoxidized groups are linked.

A widely used class of polyepoxides which can be used in tne present invention are the epoxy polyethers obtained by reacting a halogen containing epoxide or dihalohydrin, such as epichlorohydrin, epibromohydrin, 3-chloro-1,2-epoxy octane, and the like with either a polyhydric phenol or a polyhydric alcohol.

This invention is further illustrated in the following representative examples.

EXAMPLE 1

The following general procedures for preparing, curing and testing adhesive bonds were used throughout the remainder of the Examples.

The two components, i.e., the epoxy resin component and the hardener component, were mixed in appropriate weight amounts at room temperature. The mixed thixotropic adhesive which resulted was applied in the form of ⅜ inch beads across a first substrate (sheet molding compound laminate) that measured 12 inches by 4 inches by 100 mils and the substrate was dry wiped with a clean cloth before application of the adhesive beads to it. The adhesive beads were treated with a few 30 mils diameter glass beads to get a final glue line thickness of 30 mils, a second laminate was then placed on the top of the first containing the adhesive with a one-inch overlap. The samples were then cured in an electromagnetic induction fixture for one minute or less and were then placed in an oven at 285° F. for postcuring for 30 minutes. Test specimens were cut from these cured samples into one inch strips which were used for testing. Several lap shear test samples were run for each adhesive panel tested.

Test Procedure

The following tests were carried out by using a set of at least three samples for each type of test.
A. Shear strength test at room temperature.
B. Postbaking at 400° F. for an additional one hour and tested shear strength at room temperature.
C. Shear strength test at 180° F.
D. Shear strength test at room temperature after immersion of sample for 24 hours in 206° F. water.
E. Shear strength test at 180° F. after one hour of 400° F. postbake.

Several commercially available sheet molding compound laminates (SMC) were tested and the results were found to be similar for all of them.

EXAMPLE 2

An epoxy component was prepared by reacting 350 g of liquid diglycidyl ether of Bisphenol-A with 40 g of carboxylic acid-terminated butadiene/acrylonitrile rubber containing 18% by weight of acrylonitrile (1300×8 CTBN from BF Goodrich Co.) at about 120° C. for one hour in the presence of 0.5 g of triphenyl phosphine and blending the resulting liquid with 320.4 g of a diglycidyl ether of polypropylene glycol (epoxy equivalent weight of 320), 13.2 g of isophoron diisocyanate, 132 g of powdered ferric oxide, 66.6 g of talc and 7 g of fumed silica. This thixotropic paste was used as an epoxy component.

EXAMPLE 3

The hardener component was prepared by bending 35 parts by weight of poly(propylene oxide) tri-primary amine (molecular weight of 400), 9.8 parts of tris(dimethylaminomethyl) phenol, 2.9 parts of aminoethylpiperazine, 11.6 parts of Bisphenol-A, 34 parts of ferric oxide and 1.4 parts of fumed silica. This thixotropic paste was used as a hardener component.

EXAMPLE 4

The epoxy component of Example 2 (30 g) and the hardener component of Example 3 (20 g) were mixed to give a thixotropic paste having nonsagging properties when applied to vertical surfaces. The room temperature open time of the mixture was determined to be about 30 minutes. Lap shear ashesive bonds were prepared by following the procedure given in Example 1 and the curing was carried out by electromagnetic induction for 50 seconds and 60 seconds under the induction current of approximately 425 amps using a 20 kw generator. In each case the bonds developed enough green strength (handling strength) to be moved without any loss of bond. The lap shear test results of the postcured bonus using the test procedures described in Example 1 are given in the following Table.

TABLE

| Sample No. | Test Procedure | 50 Sec. | 60 Sec. |
|---|---|---|---|
| 1 | A | 700 DL* | 490 DL |
| 2 | A | 760 DL | 415 DL |
| 3 | A | 510 DL | 460 DL |
| 4 | A | 460 DL | 420 DL |
| 5 | B | 600 DL | 490 DL |
| 6 | B | 580 DL | 470 DL |
| 7 | B | 440 DL | 360 DL |
| 8 | B | 410 DL | 400 DL |
| 9 | C | 400 DL | 430 DL |
| 10 | C | 500 CL | 330 FT |
| 11 | C | 410 FT** | 400 FT |
| 12 | D | 310 DL | 300 DL |
| 13 | D | 400 DL | 310 DL |
| 14 | D | 300 DL | 300 DL |
| 15 | E | 540 FT | 400 DL |
| 16 | E | 600 FT | 350 DL |
| 17 | E | 290 DL | 370 FT |

*DL = substrate delaminated at the bond line
**FT = surface fiber tear at the bond line

We claim:
1. A two component adhesive composition which is curable by induction heating which comprises a mixture of the components
(I) an epoxy resin component comprising (a) an epoxy resin, from 1 to 15% by weight of which is a flexible di- or tri-glycidyl ether of a poly(alkylene glycol), (b) from 1 to 15% by weight of the epoxy resin of a carboxylic acid terminated acrylonitrile-butadiene rubber and (c) from 2 to 50% by weight of an electromagnetic energy absorbing material selected from the group consisting of particulate, magnetizable iron, cobalt, nickel, alloys of nickel and iron, alloys of nickel and chromium, inorganic oxides of iron, inorganic oxides of nickel, carbonaceous materials and mixtures thereof, and
(II) a hardener component comprising (a) from 50 to 90% by weight of a poly(alkylene oxide) di- or tri-primary amine having a molecularr weight greater than 2000, (b) up to 20% by weight of a poly(alkylene oxide) di- or tri-primary amine and/or amido-amine having a molecular weight in the range of from 200 to 600, (c) up to 10% by weight of a compound selected from the group consisting of ethylene diamine, aminoethyl piperazine and di-ethanol amine, (d) from 2 to 15% by weight of a phenolic compound, (e) up to 15% by weight of an amine cure accelerator selected from the group consisting of tertiary amino group containing molecules and boron trifluoride-amine complexes and (f) from 20 to 60% by weight of an electromagnetic material selected from the group consisting of particulate, magnetizable iron, cobalt, nickel, alloys of nickel and iron, alloys of nickel and chromium, inorganic oxides of iron, inorganic oxides of nickel, carbonaceous materials and mixtures thereof.

2. The composition of claim 1 wherein the epoxy resin is a compound containing more than one group of the formula

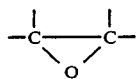

3. The composition of claim 2 wherein (I) comprises a diglycidyl ether of Bisphenol-A, a carboxylic acid terminated butadiene, acrylonitrile rubber and a diglycidyl ether of poly(propylene glycol).

4. The composition of claim 2 wherein (II) comprises a poly(propylene oxide) tri-primary amine, tris-(dimethylaminomethyl) phenol, and aminoethyl piperazine.

5. The composition of claim 2 wherein (III) is ferric oxide.

* * * * *